(No Model.) 2 Sheets—Sheet 1.
C. E. POLLARD.
CLUTCH MECHANISM FOR POWER PRESSES.
No. 477,604. Patented June 21, 1892.
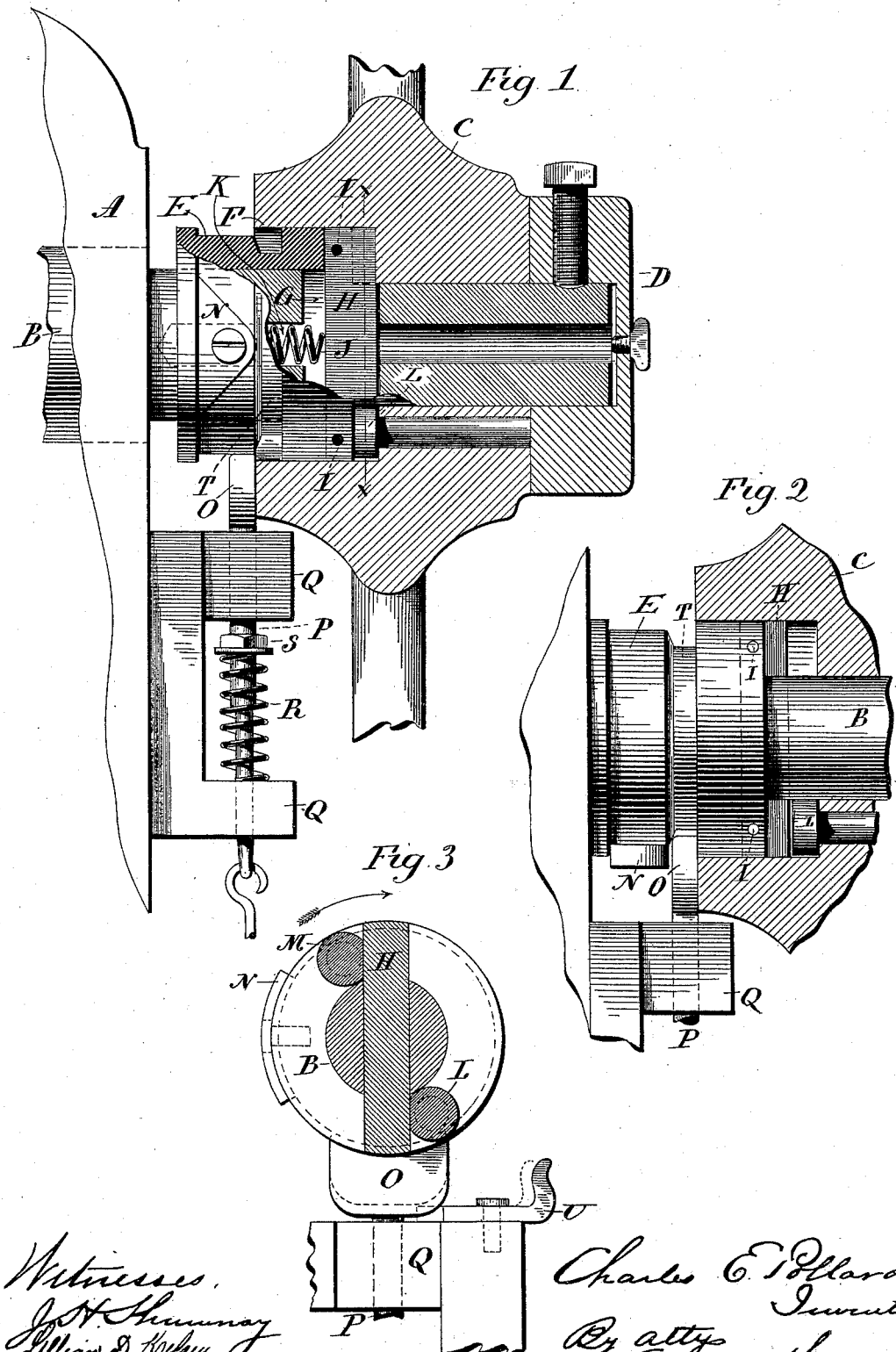

(No Model.) 2 Sheets—Sheet 2.
C. E. POLLARD.
CLUTCH MECHANISM FOR POWER PRESSES.
No. 477,604. Patented June 21, 1892.
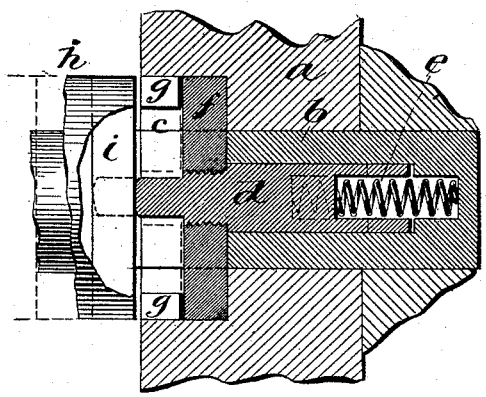
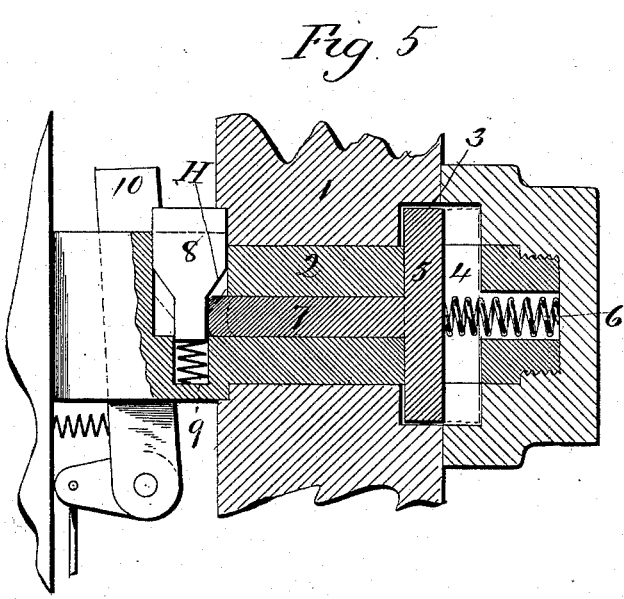
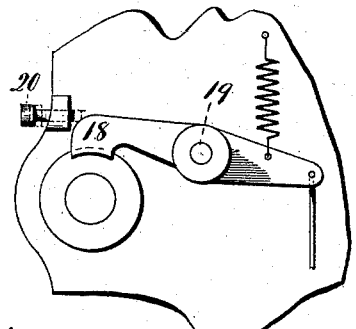
Witnesses
J. N. Shumway
Lillian D. Kelsey
Charles E. Pollard
Inventor
By atty
Earle Seymour

UNITED STATES PATENT OFFICE.

CHARLES E. POLLARD, OF MIDDLETOWN, CONNECTICUT, ASSIGNOR TO THE E. W. BLISS COMPANY, LIMITED, OF BROOKLYN, NEW YORK.

CLUTCH MECHANISM FOR POWER-PRESSES.

SPECIFICATION forming part of Letters Patent No. 477,604, dated June 21, 1892.

Application filed March 7, 1892. Serial No. 424,065. (No model.)

*To all whom it may concern:*

Be it known that I, CHARLES E. POLLARD, of Middletown, in the county of Middlesex and State of Connecticut, have invented a new Improvement in Clutch Mechanism for Power-Presses; and I do hereby declare the following, when taken in connection with accompanying drawings and the letters and figures of reference marked thereon, to be a full, clear, and exact description of the same, and which said drawings constitute part of this specification, and represent, in—

Figure 1, a sectional side view of the clutch mechanism as applied to a power-press, the parts being in the engaging position; Fig. 2, the same as Fig. 1, showing the parts in the disengaged position; Fig. 3, a transverse section cutting on line *x x* of Fig. 1; Figs. 4, 5, 6, and 7, modifications.

This invention relates to an improvement in the mechanism by which the power is engaged with the driving-shaft of power-presses. In such presses it is desirable that the power may be disengaged when the slide or gate is in the raised position, and also that the machine may have the capacity of automatically disengaging the power at each revolution, and when the gate is in the up position, or at any other predetermined point which may be desirable.

The object of this invention is a simple construction of clutch mechanism between the shaft and the driving pulley or wheel, whereby such disengagement may be automatically produced as well as ready re-engagement when occasion requires, and the invention consists in the construction, as hereinafter described, and particularly recited in the claims.

In illustrating the invention only a small portion of the rear of the frame of the press is shown, A representing this rear portion of the press.

B represents the shaft which is arranged in the press in the usual manner and connected with the slide or gate also in the usual manner. The arrangement of the slide or the connections between the slide and the shaft are immaterial to this invention, the invention being applicable to various constructions of slide and intermediate mechanism.

C represents the hub of the driving wheel or pulley, which is arranged loose upon the shaft, the shaft provided at its outer end with a collar D to retain the pulley on the shaft, and the wheel or pulley is constructed for the application of power thereto in the usual manner. (Not necessary to be illustrated.)

As shown in Fig. 1, a longitudinally-sliding sleeve E is arranged on the shaft inside the driving-wheel, and the hub of the wheel upon its inner side is constructed with a concentric recess F, within which the said sleeve may slide forward and backward. Through the shaft is a diametrical mortise G, and through this mortise is a key H, which in width is narrower than the length of the mortise G, and so that the key may be allowed a limited extent of movement longitudinally. This key projects out through the ends of the mortise G and is secured in the sleeve E, here represented as by pins or screws I, so that the key becomes substantially a part of the sleeve E, and so as to move longitudinally with the sleeve. A spring is provided which operates to force the sleeve rearward or toward the hub of the wheel. As here represented, a spring J is arranged in a central cavity K in the shaft forward of the mortise G and opening into it, so that the spring may bear against the forward edge of the key, and thus impart its force to the key and sleeve, tending to force them rearward, but adapted to yield for the forward movement of the sleeve and key. Within the recess in the hub one or more stationary studs or projections L M are arranged, (see Fig. 3,) which project into the recess, so that when the sleeve and the key under the action of the spring are moved rearward they will engage with the studs L M, as seen in Fig. 3. In Fig. 3 the arrow indicates the direction of revolution of the driving-wheel. Hence when the key H is in its rear position, as seen in Figs. 1 and 3, it will be engaged by the studs L M of the driving-wheel, so that revolution of the driving-wheel will be imparted to the key H, and the key H, extending through the shaft, communicates revolution to the shaft so long as the engagement between the key and the driving-wheel shall be continued; but if the sleeve be withdrawn, as seen in Fig. 2, then the key is taken out of engagement with the studs, and so that the driving-wheel will revolve without connection with the shaft. Consequently when such disengagement is made the revolution of the shaft will cease.

The sleeve E at one point is provided with a cam N, and at a point in the path of the said cam, when the sleeve is engaged with the drive-wheel, is a dog O, which the cam N must pass in the revolution of the shaft. When the sleeve is engaged with the wheel, as seen in Fig. 1, and as the sleeve revolves, the cam will strike the dog O and, acting in conjunction therewith, the sleeve will be forced forward, as seen in Fig. 2, and correspondingly draw the key forward and so as to withdraw the key from its engagement with the studs of the driving-wheel, and as soon as the cam has passed onto the dog to thus withdraw the sleeve from engagement with the wheel the rotation of the shaft will instantly cease. The arrangement of the cam N with relation to the dog O should be such that the arrest in the revolution of the shaft may occur at the desired position of the gate or slide, and this is usually when the gate or slide is in its up or highest position.

To permit the re-engagement of the driving-wheel with the shaft when it is desired that power shall be communicated to the shaft, the dog O is adapted to be withdrawn from the path of or out of engagement with the cam. As here represented, the dog is constructed as a part of a vertical spindle P, arranged in bearings Q, and so that it may be moved up and down, and it is normally held in the up or cam-engaging position by means of a spring R around the spindle, one end of the spring resting upon the lower bearing of the spindle and the other end resting against a collar S on the spindle, and from the spindle connection is made in the usual manner to a foot-pedal or other convenient point where the operator may at pleasure draw the dog out of the path of the cam, and so that when the sleeve stands in the arrested position engaged with the dog the press will stand so long as such engagement continues; but when the dog is withdrawn then the spring of the sleeve reacts and forces the sleeve into engagement with the driving-wheel and so that the power will be communicated to the shaft so long as the dog be held in the withdrawn position.

It is desirable to positively lock the sleeve in its disengaged position. To this end the sleeve is constructed with an annular groove T, the forward edge of the groove preferably beveled, as shown, and this groove corresponds in width to the thickness of the edge of the dog, and the position of the groove is such with relation to the dog that when the cam has withdrawn the sleeve by its engagement with the dog the dog is then free under the action of its spring to be driven into the groove T, as seen in Fig. 2, and thus lock the sleeve in its disengaged position, the beveled side of the groove operating with the dog as a cam to draw the sleeve a little farther out of its engagement with the wheel than the cam itself may do and so as to make disengagement positive.

To prevent accidental withdrawal of the dog from engagement with the sleeve, a locking device is provided, which may be applied, when the dog is engaged with the groove of the sleeve, so as to positively prevent the withdrawal of the dog from such engagement. As illustrated in Fig. 3, the lock for the dog is represented as a sliding bolt U, arranged on the upper bearing, in which the dog is supported, and so that normally the bolt, when withdrawn, as in Fig. 3, has no effect upon the dog; but when the dog is in the up position the bolt may be thrown forward, as represented in broken lines, and so as to stand beneath the dog and thereby prevent its accidental withdrawal.

While preferring the construction and arrangement of the key and studs as described, they may be otherwise arranged, for illustration, as represented in Fig. 4, in which $a$ represents the hub of the wheel, and $b$ the shaft. The wheel is constructed with a concentric recess $c$, and through the shaft a diametrical mortise is formed, as before, and in the shaft from the rear a spindle $d$ is introduced concentric with the shaft, provided with a spring $e$, the tendency of which is to force the spindle inward. This spindle extends through the mortise in the shaft, and the spindle carries a key $f$, which projects through the shaft, preferably on both sides, and within the hub of the wheel, the recess in the hub of the wheel being such as to permit the revolution of the wheel without engagement with the key; but in the recess and forward of the key one or more shoulders or projections $g$ are formed, with which the key $f$ may engage when it is forced forward, as indicated in broken lines. The tendency of the spring is to force the key into engagement with the shoulders $g$ $g$, as in the first illustration; but this movement is now forward instead of rearward, as in the first illustration.

To disengage the key, a sleeve $h$ is provided like the sleeve in the first illustration, and this sleeve carries a bar $i$ diametrically through the mortise in the shaft and against which the forward end of the spindle may bear, as seen in Fig. 4. The cam on the sleeve in this case will operate in the opposite direction, so that as the shaft revolves under the engagement of the power the sleeve will at a predetermined time be forced rearward to operate upon the spindle $d$ to take the key $f$ rearward and out of engagement with the shoulders $g$; but when the sleeve is left free then the key will be forced into engagement with the drive-wheel.

Another arrangement of the diametrical key for engaging the power with the shaft is represented in Fig. 5. In this case 1 represents the hub of the driving-wheel and 2 the shaft, and in this illustration the hub is constructed upon its rear face with a concentric recess 3, the recess being provided with shoulders, as in the other illustrations. Through the shaft at the rear is the diametrical mortise 4, in which the diametrical key 5 is arranged and is operated by a spring 6, tending to force it forward, so as to engage the driving-wheel. In the shaft forward of the key is a spindle 7, which is adapted to bear against the forward side of the key, and so that by means of the spindle the key may be forced rearward, as indicated in broken lines. Forward of the spindle 7 a radially-moving cam 8 is arranged, provided with a spring 9, the tendency of which is to force the cam outward, and this cam is adapted to engage a dog 10 as the shaft revolves, so that when the dog stands in the path of the projecting end of the cam the cam will be forced inward, as indicated in broken lines, in a well-known manner for power-press clutch mechanism. The cam 8 is constructed with a beveled working surface 11, which is adapted to bear against the forward end of the spindle 7, and so that as the cam 8 is forced inward, as seen in broken lines, the spindle 7 will be forced rearward and correspondingly move the key 5 out of engagement with the driving-wheel.

Instead of making the dog-interlocking device in the form of a bolt, as first illustrated, or making the dog to slide vertically, as first illustrated, the dog may be otherwise constructed and arranged—as, for illustration, (see Fig. 6,) in which the dog 12 is hung at one side upon a pivot 13, so as to swing in a plane at right angles to the axis of the sleeve 14, and combined with this is a locking-cam 15, constructed with a suitable handle 16, by which it may be turned upon its pivot 17, as indicated in broken lines, so as to leave the dog free to be drawn out of engagement with the sleeve or turned up to lock the dog in its engagement.

Another illustration of the locking device is shown in Fig. 7, in which 18 represents the dog hung upon a pivot 19, so as to swing as in the last illustration. Combined with this is a set-screw 20, which normally stands out of engagement with the dog; but may be turned into engagement with the dog, as indicated in broken lines.

From the foregoing it will be understood that the invention is not to be understood as limited to any specific construction, the inventor reserving to himself the right to modify his invention so long as he does not depart from the general principles herein set forth.

I claim—

1. In a power-press, the driving-wheel arranged loose upon the shaft, the shaft constructed with a diametrical mortise, combined with a key arranged in said mortise and adapted to be moved backward and forward therein, a sleeve on the shaft adapted to engage said key, so as to move it in one direction, a spring arranged to move said key in the opposite direction, and the driving-wheel constructed with one or more projections, with which the said key is adapted to engage under the action of said spring, but from which the key will be disengaged by the movement of the sleeve, substantially as described.

2. In a power-press, the combination of a driving-wheel loose on the shaft of said press, a sleeve arranged upon said shaft and so as to slide backward and forward thereon, the shaft constructed with a diametrical mortise, a key in said mortise narrower than the length of the mortise and connected to said sleeve, whereby longitudinal movement of the sleeve will be imparted to the key, a spring arranged to force said sleeve and key in one direction, a cam on the sleeve, a stationary dog with which said cam on the sleeve is adapted to engage to move the sleeve in the other direction, and the wheel constructed with one or more projections, with which said key is adapted to engage under the action of the spring, substantially as described.

3. In a power-press, the combination of a wheel loose upon the shaft, a sleeve arranged to slide longitudinally on said shaft, the shaft constructed with a diametrical mortise, a key through said mortise narrower than the length of the mortise and connected to said slide, so as to move therewith, a spring operating to move the key and sleeve in one direction, a cam on the sleeve, a dog in the path of said cam and with which said cam is adapted to engage to move the sleeve in the opposite direction, one or more projections on the hub of the wheel, with which the said key is adapted to engage under the action of said spring, the sleeve constructed with an annular groove, and the dog provided with a spring serving to force said dog into the said groove after the action of the sleeve-cam upon the dog, substantially as described.

In testimony whereof I have signed this specification in the presence of two subscribing witnesses.

CHARLES E. POLLARD.

Witnesses:
ALTON H. FANCHER,
ROBT. J. GOOD.